US011679356B2

(12) United States Patent
Sandru et al.

(10) Patent No.: US 11,679,356 B2
(45) Date of Patent: Jun. 20, 2023

(54) SURFACE MODIFIED MEMBRANES FOR GAS SEPARATION, AND A METHOD FOR PREPARING THEREOF

(71) Applicant: SINTEF TTO AS, Trondheim (NO)

(72) Inventors: Marius Sandru, Trondheim (NO); Eugenia Mariana Sandru, Trondheim (NO); Per Martin Stenstad, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 17/051,706

(22) PCT Filed: Apr. 30, 2019

(86) PCT No.: PCT/NO2019/050098
§ 371 (c)(1),
(2) Date: Oct. 29, 2020

(87) PCT Pub. No.: WO2019/212360
PCT Pub. Date: Nov. 7, 2019

(65) Prior Publication Data
US 2021/0236987 A1    Aug. 5, 2021

(30) Foreign Application Priority Data
Apr. 30, 2018  (NO) .................................. 20180619

(51) Int. Cl.
*B01D 53/22*  (2006.01)
*B01D 67/00*  (2006.01)
(Continued)

(52) U.S. Cl.
CPC ......... *B01D 53/228* (2013.01); *B01D 67/009* (2013.01); *B01D 67/0093* (2013.01);
(Continued)

(58) Field of Classification Search
CPC .............. B01D 69/02; B01D 2323/345; B01D 2257/504; B01D 2256/10; B01D 71/70;
(Continued)

(56) References Cited

U.S. PATENT DOCUMENTS 5,352,272 A * 10/1994 Moll ...................... B01D 71/50
96/9
5,837,032 A * 11/1998 Moll ...................... C08G 75/06
95/52
(Continued)

FOREIGN PATENT DOCUMENTS

CN         102089067 A     6/2011
CN         104492286       10/2016
(Continued)

OTHER PUBLICATIONS

Matsuyama H et al.: "Facilitated transport of CO2 through various ion exchange membranes prepared by plasma 10 Jrafl polymerization", Journal of Membrane Science, vol. 117, No. 1, Aug. 21, 1996 (Year: 1996).*
(Continued)

*Primary Examiner* — Anthony R Shumate
(74) *Attorney, Agent, or Firm* — Wissing Miller LLP

(57) ABSTRACT

The present invention relates to a $CO_2$ selective gas separation membrane and a method for preparing the gas separation membrane and the use thereof. The $CO_2$ selective gas separation membrane comprises a gas permeable or porous support layer; and at least one gas permeable polymer layer, which is surface modified with polymer chains having $CO_2$ philic groups, wherein the gas permeable polymer layer has a spatially controlled distribution of the $CO_2$ philic groups on the surface thereof. The method of preparing the $CO_2$ selective gas separation membrane, comprises the steps of: depositing at least one gas permeable polymer layer on a porous or gas permeable support layer to form a dense
(Continued)

membrane, and surface modifying the dense membrane with polymer chains having $CO_2$ philic groups, to obtain spatially controlled distribution of the $CO_2$ philic groups on the surface thereof.

13 Claims, 5 Drawing Sheets

(51) Int. Cl.
  *B01D 69/02* (2006.01)
  *B01D 69/10* (2006.01)
  *B01D 69/12* (2006.01)
  *B01D 71/32* (2006.01)
  *B01D 71/70* (2006.01)
  *B01D 71/78* (2006.01)
  *B01D 71/82* (2006.01)

(52) U.S. Cl.
  CPC ........... *B01D 69/02* (2013.01); *B01D 69/105* (2013.01); *B01D 69/12* (2013.01); *B01D 71/32* (2013.01); *B01D 71/70* (2013.01); *B01D 71/78* (2013.01); *B01D 71/82* (2013.01); *B01D 2256/10* (2013.01); *B01D 2256/245* (2013.01); *B01D 2257/504* (2013.01); *B01D 2323/345* (2013.01); *B01D 2323/36* (2013.01); *B01D 2323/385* (2013.01); *B01D 2325/20* (2013.01)

(58) Field of Classification Search
  CPC .......... B01D 2256/245; B01D 2323/36; B01D 67/0093; B01D 53/228; B01D 71/82; B01D 71/78; B01D 67/009; B01D 2323/385; B01D 71/32; B01D 2325/20; B01D 69/105
  See application file for complete search history.

(56) References Cited

U.S. PATENT DOCUMENTS

| | | | | |
|---|---|---|---|---|
| 10,618,008 | B2* | 4/2020 | Yandrasits | B01D 71/46 |
| 10,737,220 | B2* | 8/2020 | Zhou | B01D 71/44 |
| 11,198,101 | B2* | 12/2021 | Newbloom | B01D 71/78 |
| 2007/0251388 | A1* | 11/2007 | Oyama | B01D 67/0072 96/11 |
| 2007/0256969 | A1* | 11/2007 | Ding | B01D 71/32 210/490 |
| 2010/0320142 | A1* | 12/2010 | Ge | B01D 71/32 204/164 |
| 2012/0040429 | A1* | 2/2012 | Federspiel | B01D 67/0093 435/174 |
| 2013/0312604 | A1 | 11/2013 | Amin-Sanayei | |
| 2014/0048494 | A1* | 2/2014 | Simmons, Jr. | B01F 23/23 210/150 |
| 2014/0060324 | A1* | 3/2014 | Ahn | B01D 71/70 96/10 |
| 2014/0311347 | A1 | 10/2014 | Svec | |
| 2015/0129493 | A1* | 5/2015 | Federspiel | B01D 69/08 210/651 |
| 2017/0182469 | A1* | 6/2017 | Mochizuki | B01D 71/64 |
| 2017/0312698 | A1* | 11/2017 | Belfort | B01D 71/40 |
| 2018/0272292 | A1* | 9/2018 | Mochizuki | B01D 69/12 |
| 2021/0229031 | A1* | 7/2021 | Sandru | B01D 69/144 |

FOREIGN PATENT DOCUMENTS

| | | |
|---|---|---|
| JP | 2018027520 | 2/2018 |
| WO | 2012133737 | 10/2012 |

OTHER PUBLICATIONS

Marius Sandru: "New fabrication methods for high performance CO2 Capture membranes," Jun. 14, 2017 (Jun. 14, 2017), XP055613999, Retrieved from the Internet: URL:http://programme.exordo.com/tccs-9/del egates/presentation/66/ [retrieved on Aug. 20, 2019].

Marius Sandru: "New fabrication methods for high performance CO2 capture membranes—SINTEF", Aug. 3, 2017 (Aug. 3, 2017), XP055614004, Retrieved from the Internet: URL:https://www.sintef.no/en/publications/ publication/?pubid=CRIStin+1599308 [retrieved on Aug. 20, 2019] the whole document.

Matsuyama H et al: "Selective permeation of CO2 through poly{2-(N,N-dimethyl)aminoethyl methacrylate} membrane prepared by plasma-graft polymerization technique", Journal of Membrane Science, Elsevier BV, NL, vol. 114, No. 2, Jun. 12, 1996 (Jun. 12, 1996), pp. 193-200, XP004041605, ISSN: 0376-7388, DOI: 10.1016/0376-7388(95)00318-5 abstract Experimental; figure 4.

Sandru, M. et al., New fabrication methods for high performance CO2 capture membranes, abstract of an presentation given at International Congress on Membranes and Membrane Processes, San Francisco, USA, Jul. 28, 2017-Aug. 3, 2017.

Sandru, M. et al., New fabrication methods for high performance CO2 capture membranes, presentation given Jun. 12, 2017 in Trondheim, Norway.

Polymeric surface downloaded from www.en.wikipedia.org, version for page is dated at Mar. 28, 2018 See paragraph "Grafting techniques".

International Search Report mailed in PCT/NO2019/050098 dated Sep. 25, 2019 (3 pages).

Norwegian Search Report mailed in No. 20-180619 dated Sep. 11, 2018 (2 pages).

International Preliminary Report on Patentability mailed in PCT/NO2019/050098 dated Aug. 10, 2020 (21 pages).

First office action issued by the China National Intellectual Property Administration (CNIPA) in 201980036499.2 dated May 6, 2022.

New fabrication methods for high performance CO2 capture membranes, Marius Sandru et al., International Congress an Membranes Membrane Processes, https://www.sintef.no/en/publ ications/publication/?pubid= CRIStin+1599308, Aug. 4, 2017.

* cited by examiner

SURFACE MODIFIED MEMBRANES FOR GAS SEPARATION, AND A METHOD FOR PREPARING THEREOF

CROSS-REFERENCE TO RELATED APPLICATIONS

This application is a 371 of PCT/NO2019/050098 filed on Apr. 30, 2019, published on Nov. 7, 2019 under publication number WO 2019/212360, which claims priority benefits from Norwegian Patent Application No. 20180619 filed Apr. 30, 2018, the disclosure of each is incorporated herein in their entirety by reference.

TECHNICAL FIELD

The present invention relates to $CO_2$ capture from gas mixtures by use of gas separation membranes. In particular, the invention relates to $CO_2$ selective polymeric membranes and the method of producing such membranes. The invention is also directed to the use of the $CO_2$ selective polymeric membranes.

BACKGROUND/PRIOR ART

Existent technologies for $CO_2$ capture from flue gas streams, such as conventional absorption or adsorption, have a high energy consumption and overall costs and represent a major obstacle for industrial implementation in the following major markets (by amount of $CO_2$ emitted): energy sector (flue gas from power plants), oil and gas (natural gas sweetening), industry (flue gas from e.g. cement, steelmaking). In addition, the chemicals used in amine absorption represent an extra pollution source to the environment.

Membrane technology for gas separation has become widely used. While polymeric membranes are economical and technologically useful, they are limited by their performance. The balance between permeability and selectivity affects the use of polymeric membranes for $CO_2$ separation from flue gas streams, and $CO_2$ separation becomes very expensive due to low permeability, which will require an extremely big membrane area leading to high investments costs.

In membrane science it is assumed that in order to selectively separate two gases in a gas mixture you need to prepare a dense, selective (towards one of the gases) polymer layer which is either:
1) uniform (made of same polymer material)
2) a blend of different polymers, or
3) a mixture of polymer(s) with particles.

The dense polymers layers may be $CO_2$ selective because of the intrinsic chemical structure of polymer; the polymers have $CO_2$ philic groups, such as amines, in their polymer chains, and/or they have added particles (carbon nanotubes, silica, zeolites, etc.) to enhance the $CO_2$ selectivity or permeability of a given polymer.

In order to form a thin layer (i.e. in the range 200 nm to 100 µm), the uniform polymer (1), the blend of different polymers (2), or the mixture of polymers with particles (3) are mixed in a solution with a solvent and casted/coated/deposited as a film that evaporates and forms a dense selective membrane. The composition of the polymer layers of the membrane and the spatial arrangement/alignment (vertical or horizontal) of the $CO_2$ philic groups or particles relative to direction of gas molecules from the feed side of the membrane to the permeate side are relatively random and depend inter alia on the mixing of the components, compatibility of polymer and $CO_2$ philic entities (chemical groups, particles or other polymer); gravity, how fast solvents evaporates, particle conglomeration, etc.

Polymeric membranes separate the $CO_2$ from a large and dilute stream (~1-20% $CO_2$) due to higher $CO_2$ solubility and/or diffusion coefficient (solution-diffusion mechanism) compared to other gases such as $N_2$ and $O_2$ (flue gas, breathing), $CH_4$ (natural gas, biogas), or $H_2$ (syngas). The $CO_2$ selectivity versus the other gases ($N_2$, $O_2$, $CH_4$, $H_2$ or other gases) and $CO_2$ permeability is given by intrinsic properties of the membrane material. The driving force for the transport of gas molecules through a membrane is due to a partial pressure or concentration difference between feed and permeate side created by using a sweep gas or vacuum on the permeate side of the membrane.

One option for membrane separation is the use of a facilitated transport membrane. The most known membrane type using facilitated transport is supported liquid membrane (SLM) with mobile facilitated transport carriers. These have been studied for over two decades and are known to have both high gas permeability and high gas selectivity. However, for the SLM membranes serious degradation problems, such as evaporation and leakage from membrane of solution and deactivation of the carriers have restricted their further development and application.

Gas separation membranes still have a need for improved $CO_2$ separation performance in order to be cost effective for industrial applications especially at low $CO_2$ concentrations in a mixture, below 20%, (preferably below 10%, below 5% or even below 1%). These low $CO_2$ concentrations are very difficult to separate due to the lack of driving force.

SHORT SUMMARY OF THE INVENTION

The present invention provides a $CO_2$ selective gas separation membrane comprising a gas permeable or porous support layer; and at least one gas permeable polymer layer which is surface modified with polymer chains having $CO_2$ philic groups, wherein the gas permeable polymer layer has a spatially controlled distribution of the $CO_2$ philic groups on the surface thereof. The gas permeable polymer is permeable to all gases, including $CO_2$. It may comprise a hydrophilic or a water vapour permeable polymer. The $CO_2$ philic groups may be selected from amines, ethylene oxide, ethers, amides or hydroxyl groups. In one embodiment, the $CO_2$ philic groups are amines selected from the group consisting of ethylene diamine (EDA), diethylene triamine and triethylene tetramine. The gas permeable polymer is preferably selected from the group of perfluoro polymers such as poly[4,5-difluoro-2,2-bis(trifluoromethyl)-1,3-dioxole-co-tetrafluoroethylene]; PTMSP (poly[1-(trimethylsilyl)-1-propyne]); PMP (poly(4-methyl-2-pentyne)); PDMS (polydimethyl siloxane) and PVA (polyvinyl alcohol). Preferably, the membrane has a brush-like structure with spatially controlled distribution of the $CO_2$ philic groups.

The present invention further provides a method for preparing a $CO_2$ selective gas separation membrane, comprising the steps of: depositing at least one gas permeable polymer layer on a porous or gas permeable support layer to form a dense membrane, and surface modifying the dense membrane with polymer chains having $CO_2$ philic groups, to obtain spatially controlled distribution of the $CO_2$ philic groups on the surface thereof In one embodiment, the surface modification of the dense membrane with $CO_2$ philic groups includes UV grafting. In one embodiment, in a first step an initiator is grafted onto the at least one polymer layer by UV radiation to form grafting points, and in a second step a monomer is added to the grafting points and polymerized by UV radiation to form grafted polymers. If the monomer does not include $CO_2$ philic groups, the $CO_2$ philic groups may be introduced by reacting the grafted polymer with compounds containing such $CO_2$ philic groups. In a preferred embodiment, the method comprises successive steps of depositing polymer layers and modifying the surfaces thereof with $CO_2$ philic groups to obtain a multi-layered structure having $CO_2$ philic groups on top, in the middle and in bottom of the selective polymer layer leading to a controlled spatially distribution of $CO_2$ philic groups throughout all the membrane thickness and not only on the surface.

The invention is also related to the use of the inventive gas separation membrane for separation of $CO_2$ from a gas mixture.

FIGURES

Figure 10:
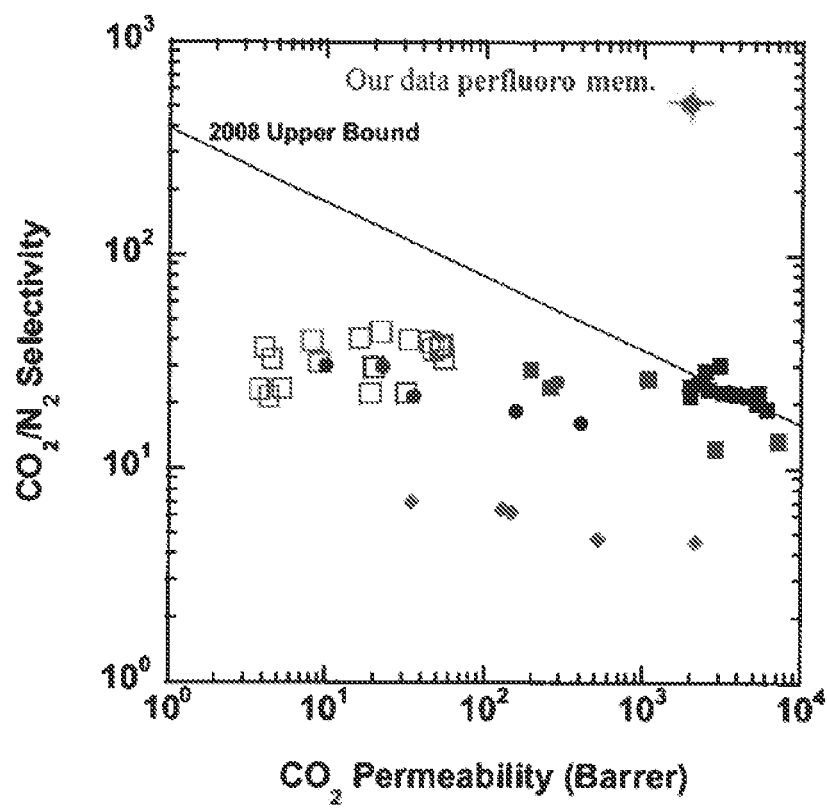

FIG. 10 shows $CO_2$ permeability versus $CO_2/N_2$ selectivity comparison of data from experiments using the inventive membrane with reported data in the literature, see Sanders, D. F., et al., *Energy-efficient polymeric gas separation membranes for a sustainable future: A review*. Polymer, 2013. 54(18): p. 4729-4761.

Figure 11:
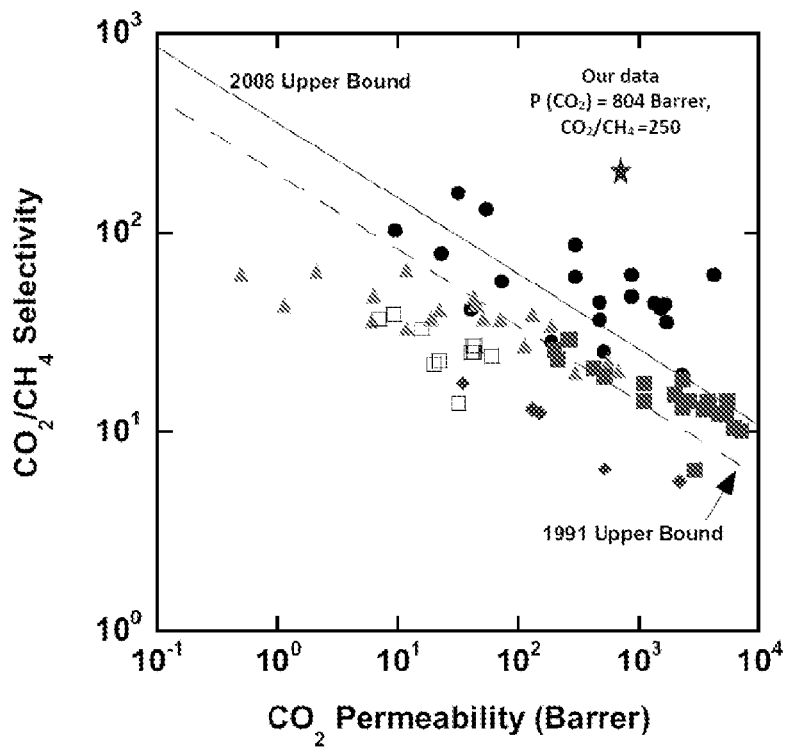

FIG. 11 shows $CO_2$ permeability versus $CO_2/CH_4$ selectivity comparison of data from experiments using the inventive membrane with reported data in the literature, see Sanders, D. F., et al., *Energy-efficient polymeric gas separation membranes for a sustainable future: A review*. Polymer, 2013. 54(18): p. 4729-4761.

DETAILED DESCRIPTION OF THE INVENTION

In the present invention, the surfaces of already formed non-selective/low $CO_2$ selective dense membranes are modified by introducing $CO_2$ philic groups to become $CO_2$ selective. The $CO_2$ philic groups on the surface of the gas permeable polymer are distributed in a spatially controlled manner. In this way, a non-selective polymer layer on a support can be modified by different methods such as UV grafting and chemical modification to become $CO_2$ selective.

The inventors have found that that use of certain $CO_2$ philic groups provides excellent results. Preferably, $C_1$-$C_{10}$, linear or branched molecules having $CO_2$ philic groups are used. In particular, $C_1$-$C_6$ linear or branched molecules having $CO_2$ philic groups or even more preferred $C_1$-$C_3$ linear or branched molecules having $CO_2$ philic groups are used. The $CO_2$ philic groups may be selected from e.g. amines, ethylene oxide, ethers, amides or hydroxyl groups. It has been found that use of longer chains molecules, larger than about $C_{10}$, causes crosslinking and formation of dense layers, and thus, lower $CO_2$ flux. In one embodiment, the $CO_2$ philic groups are short chain ($C_1$-$C_3$) amines such as ethylene diamine (EDA), diethylene triamine and triethylene tetramine.

The present invention provides a gas separation membrane with well-defined geometry of the $CO_2$ carriers/$CO_2$ philic groups. The structure is open and the polymer chains form a brush-like structure.

The $CO_2$ permeability of a membrane is often expressed in Barrer. 1000 Barrer represents a permeance of 2.7 m³ (STP)/(bar m² h) for 1 µm thick membrane. In this disclosure, the term "high $CO_2$ permeability" means that the $CO_2$ permeability should be above 1000 Barrer. By the term "low $CO_2$ selectivity" it is meant that the ratio of permeability of $CO_2$ with relation to another gas (e.g. $CH_4$, $N_2$) is lower than 20.

The present invention relates to a gas separation membrane comprising at least one $CO_2$ selective polymer layer being a gas permeable polymer layer surface modified by introduction of $CO_2$ philic groups. The surface modification results in a spatially controlled distribution of $CO_2$ philic groups on the gas permeable polymer layer.

Figure 1:
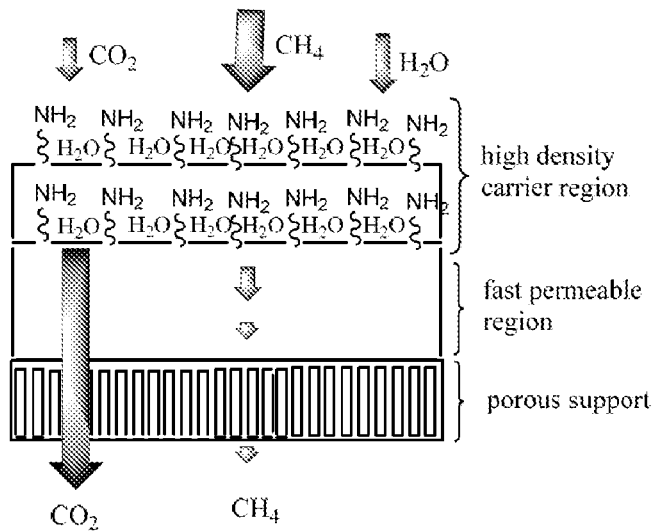
FIG. 1 shows the separation principle and structure of a surface modified gas separation membrane (prior art).
Figure 2:
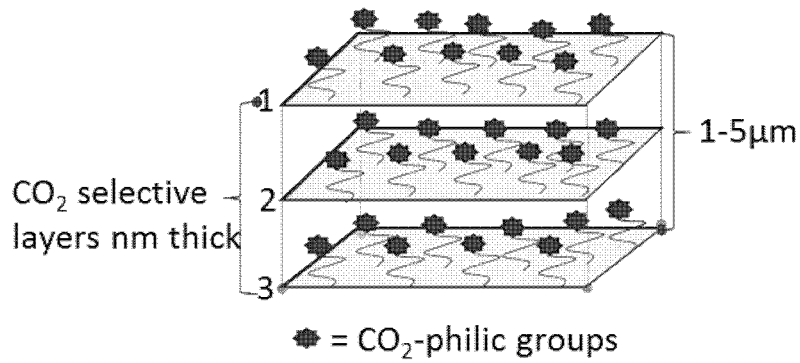
FIG. 2 shows a three layer polymer membrane (without the support layer) having high density carrier regions with controlled spatially distribution comprising ultrathin layers densely packed with $CO_2$ philic groups.

FIG. 1 generally shows the separation principle of a surface modified gas separation membrane. The membrane comprises a fast-permeable region, which may be made of a polymer having high $CO_2$ permeability and a low $CO_2$ selectivity. The polymer layer is coated on a suitable support layer for mechanical strength. The high density carrier region comprises ultrathin layers (in FIG. 1 two layers; and in FIG. 2 three layers densely packed with $CO_2$ philic groups, such as $NH_2$ in FIG. 1. The high concentration of amine groups on the surface results in an increased $CO_2$ diffusion rate and decreases the mass transfer resistance of $CO_2$ through the membrane. These layers may also partially block diffusion, from feed to permeate, of non-reactive gases such as $N_2$, $CH_4$, $O_2$ and $H_2$. The size of the arrows of the gases in FIG. 1, $CO_2$ and $CH_4$, illustrates the concentration of the gases on each side of the membrane.

Figure 3:
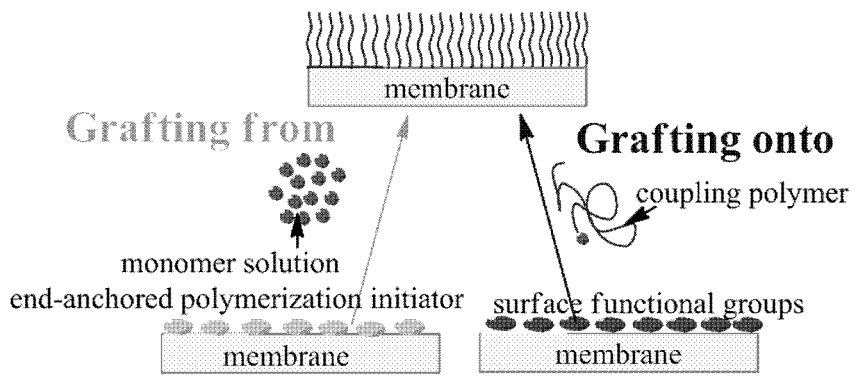
FIG. 3 shows a schematic view of different approaches for surface modification of membranes.

FIG. 3 shows two different approaches for surface modification of membranes depending on the type of polymer used for membrane preparation: with or without functional groups (like —OH groups for example in polyvinyl alcohol). The membrane comprises a gas permeable polymer layer deposited on a gas-permeable or porous support layer.
1. Grafting onto is applicable to polymers that have functional groups to react with the end functional groups of the polymer to be attached (grafted) onto the surface (the polymer to be grafted is synthesized separately or purchased)

2. Grafting from is applicable to polymers that do not possess functional groups. In this case, the monomer coupling to the membrane surface is facilitated by an initiator, which creates reactive sites on the membrane surface (under UV radiation for example) in the first step. Then, the surface initiator initiates a graft polymerization (under UV radiation) of the added monomer and a new polymer is grown from the membrane surface in the second step.

By using any of the techniques "grafting onto" and "grafting from" described above, a brush like pattern is obtained. By using "grafting from" a higher density of polymer chains is achieved when compared with "grafting onto". A $CO_2$ selective layer "brush like" pattern grafted on dense polymer membranes has higher permeability than a selective layer fabricated by polymer coating or by polymer precipitation onto the dense membrane surface.

The polymer brushes onto the membrane surface are created by using a sequential approach. In the first step, active sites (grafting points) are created onto the membrane surface where the polymerization will begin. The grafting points are introduced onto membrane surface by treating the membrane with an initiator under UV radiation. In the second step, polymer brushes are grown onto the membrane surface by radical polymerization. The density (or the number) of the polymer chains onto the membrane surface is correlated with the density (or number) of the active points created in the first step as well as steric effects between grafted polymer chains. If the attached polymer does not include $CO_2$ philic groups, these groups may be introduced in another step by reacting the grafted polymer chains with $C_1$-$C_3$ alkyl compounds bearing $CO_2$ philic groups, such as ethylene diamine (EDA).

The monomers suitable for growing polymer chains must fulfil the two conditions:
1. possess functional groups not interfering with polymerization step, and
2. being capable of coupling with amines or with other $CO_2$ philic groups in the third step.

The compounds bearing the $CO_2$ philic groups capable of coupling with the grafted polymer chains are chosen so that the crosslinking between adjacent grafting polymer chains that leads to dense polymer layer is avoided or significantly lowered. The density of the $CO_2$ philic groups is correlated with the molecular weight of the compounds bearing the $CO_2$ philic groups. High densities of the $CO_2$ philic groups are achieved by using low molecular weight (i.e. short chain $C_1$-$C_{10}$, linear or branched molecules) compounds bearing the $CO_2$ philic groups due to reduced steric effects. Using shorter chain amines ($C_1$-$C_3$), such as ethylene diamine (DEA), diethylene triamine or triethylene tetramine gives the desired brush like structure and prevents crosslinking between the adjacent grafted chains.

Polymer membranes are prepared by coating (dip coating and ultrasonic spray coating) on gas permeable or porous supports by using different solvents, viscosities of solution and drying protocols in order to obtain defect free polymer coatings having a thickness in the range from 0.1 to 10 µm, preferably from 0.1 to 5 µm or from 1 to 5 µm.

Three different approaches may be used for membrane preparation:
1) Membrane formation by coating on suitable supports of highly gas permeable polymers with low $CO_2$/($N_2$, $CH_4$, $O_2$, $H_2$) selectivity (all under 20) such as:
   perfluoro polymers (Teflon AF2400, AF1600, etc.). Teflon AF2400: $CO_2$ permeability between 3900 and 2300 Barrer.
   PTMSP (poly[1-(trimethylsilyl)-1-propyne]) and PMP (poly(4-methyl-2-pentyne)). Due to their poor packed polymeric chains and glassy structure, these polymers present high free volume leading to the highest reported $CO_2$ permeability; PMP: 7000 Barrer, PTMSP: 25000 Barrer.
   Polydimethyl siloxan (PDMS), a rubbery polymer with $CO_2$ permeability of 2500-4000 Barrer
   Polyvinyl alcohol, a hydrophilic polymer with good film formation and a $CO_2$ permeability of ~200-1500 Barrer
2) Surface modification of membranes with $CO_2$-philic, active functional groups such as, amines (primary, secondary, tertiary), amides, hydroxyl by various methods (wet chemistry, UV grafting, interfacial polymerization, plasma grafting) in order to provide gas selective membranes.
3) Ultrathin multilayer structure may be formed by consecutive coating of highly permeable polymers on a support followed by surface modification with $CO_2$ reactive groups by UV grafting: coating-surface modification-coating-surface modification. One and several consecutive thin layers densely packed with $CO_2$ philic groups can be formed.

The $CO_2$ philic groups will be concentrated on the surface of the membrane in extremely thin $CO_2$ selective layers (nanometre thickness) perpendicular to the direction of gas molecules in a brush pattern. It is desirable to avoid certain $CO_2$ philic molecules, especially long, optionally branched, chain compounds ($>C_{10}$), that can crosslink between each other leading to a very dense polymer layer that prevents the access of $CO_2$ molecules to the $CO_2$ philic groups, and thus, reduces membrane permeability.

Several consecutive layers can be added on top of each other on membrane surfaces. The surface modification can be applied, both on the top membrane layer facing the feed gas and/or the bottom layer of membranes, facing the permeate side. In addition, several layers in the "middle" of the membrane may be formed by a consecutive deposition of non-selective polymer-surface modification, followed by coating of a second non-selective layer followed by surface modification, and so on.

Various gas permeable or porous supports may be used. They may be made of materials such as polysulfone (PSF), polyethersulfone (PES) polyamide (PA), polyimide (PI), polyvinyl difluoride (PVDF), polyacrylonitrile (PAN) or cellulose acetate (CA). The thickness of this support layer may vary from 10 to 250 µm. Preferably, the pore size of the porous layer is from 0.0001 µm to 1 µm.

A dense layer made of gas permeable polymers having high gas permeability can also be used as mechanical support under the $CO_2$ selective layer. This layer can be supported as well on an additional porous layer underneath, and is then called a gutter layer. The thickness of such a dense layer may vary, from about 0.1 to 1 µm (when additional porous support is used) up to around 200 µm (without porous support). Examples of suitable high gas permeable polymers are polydimethylsiloxane (PDMS), poly(l-trimethylsilyl-1-propyne) (PTMSP), polymethylpentene (PMP) or amorphous fluoropolymers such as 4,5-difluoro-2,2-bis(trifluoromethyl)-1,3-dioxole-co-tetrafluoroethylene.

The gas separation membrane of the invention may further comprise a protective layer made of high gas and water vapour permeability material coated on top of the $CO_2$ selective polymer layer. Suitable materials for the protective layer are polydimethylsiloxane (PDMS), poly(l-trimethylsilyl-1-propyne) (PTMSP), polymethylpentene (PMP) or amorphous fluoropolymers such as poly[4,5-difluoro-2,2-bis(trifluoromethyl)-1,3-dioxole-co-tetrafluoroethylene].

The CO$_2$ selective polymer layer may have a single or a multilayer structure. The multilayer structure may comprise several surface modified polymer layers together with one or more non-selective polymer layer(s) for protection of the surface modified polymer layers.

In the present invention, modification by UV-grafting has shown excellent results. Surface modification of polymers by UV grafting is a generic approach that to a large extent will be independent of the chemical composition of the polymer. A variety of new functional groups can be introduced to surfaces, for instance amino groups, by applying various grafting techniques and procedures. The preferred strategy for UV-grafting is based on a sequential UV-grafting procedure performed in twosteps. Concerning specific membranes, polydimethylsiloxane (PDMS) and poly [1-(trimethylsilyl)-1-propyne] (PTMSP) will preferably be modified by UV grafting, but polydimethylsiloxane could also be modified by hydrolysis. Polyvinyl alcohol could alternatively be chemically modified. Several methods will be used for membranes structure characterization: SEM pictures, FT-IR, AFM.

UV grafting of membranes is a general method, which can be used to introduce reactive groups or a functional layer on polymeric membranes when the polymer lacks functional groups that can be used for further modification by chemical coupling. The advantage of using UV grafting for polymeric membranes resides in its simplicity, cleanness and easy scalability.

Polymers such as PDMS and PTMSP do not possess functional groups. UV-grafting technique can be used to introduce functional groups onto the surface of PDMS and PTMSP membranes that can be further modified by chemical coupling.

Experiments

Surface Modification Methods for all Membranes

A sequential 3 steps method was used to modify membranes by UV grafting. Three monomers have been tested: Glycidyl methacrylate (GMA), amino ethyl methacrylate (AEMA) and diethyl aminoethyl acrylate (DEAEA). After grafting of poly-GMA onto membrane surface, amine groups are introduced by coupling with ethylene diamine (EDA).

1 Initiator Grafting onto Membrane Surface

An initiator, in this case benzophenone, was grafted onto a membrane surface by UV radiation. The excess of initiator was then removed to prevent unwanted side reactions. The density of the grafting points is depending on the concentration of the initiator.

2. Polymerization Step

The monomer was added and the polymerization promoted by exposing the membrane covered by monomer solution to UV radiation. The polymerization ideally starts in the grafting points on the membrane surface. The polymer chain lengths depend on the monomer concentration and the UV exposure time. The two-step approach has the advantage that it reduces undesired side reactions.

Poly amino ethyl methacrylate- and polyethylene diamine modified membranes preparation are prepared by steps 1 and 2, while the membranes modified with glycidyl methacrylate (GMA) need an additional step to introduce the CO$_2$-philic groups 3. Introduction of CO$_2$-Philic Groups Poly glycidyl methacrylate (GMA) modified membranes were further reacted with polyethylene imine (PEI) or ethylene diamine (EDA) to introduce the CO$_2$-philic groups: The membranes grafted with GMA were coated with:

PEI in borate buffer pH 9.3

20-50% EDA in water or borate buffer at pH 9.3.

EXAMPLES and RESULTS

Example 1. Polyvinyl Alcohol (PVA) Based Membranes Surface Modified

Polyvinyl alcohol (PVA) membranes were prepared by solution casting on porous support of polysulfone (PSF) with 50 000 MWCO. Commercial PVA on polyacrylonitrile (PAN) support membranes were used as well for surface modification with amines. They were modified according to steps 1-3 mentioned above. The tests were performed with mixed gases, 10% CO$_2$ in N$_2$ fully humidified at 25° C., and feed pressure from 1.2 to 5 bar, absolute pressure and the results are presented in Table 1.

Table 1 shows the comparative results of reference membrane (without surface modification) and surface modified membranes.

TABLE 1

CO$_2$ permeability/permeance and CO$_2$/N$_2$ selectivity of PVA membranes surface modified

| Membrane | CO$_2$ permeability (Barrer) | CO$_2$ permeance m$^3$(STP)/ (m$^2$ bar h) | CO$_2$/N2 selectivity |
|---|---|---|---|
| PVA/PSF support Reference | 246 | 0.09 | 11 |
| PVA/PAN support grafted with GMA + EDA | Not determined | 0.02 | 57 |

Obs. CO$_2$ permeability is equal to CO$_2$ permeance multiplied with membrane thickness for a given membrane. 1000 Barrer represents a permeance of 2.7 m$^3$ (STP)/(bar m$^2$h) for 1 micrometer thick membrane.

As can be seen, the CO$_2$/N$_2$ selectivity increased several times for surface modifications performed with amines (EDA) compared to reference membranes.

Example 2. PDMS Based Membranes Surface Modified with Amine Groups

Figure 4:
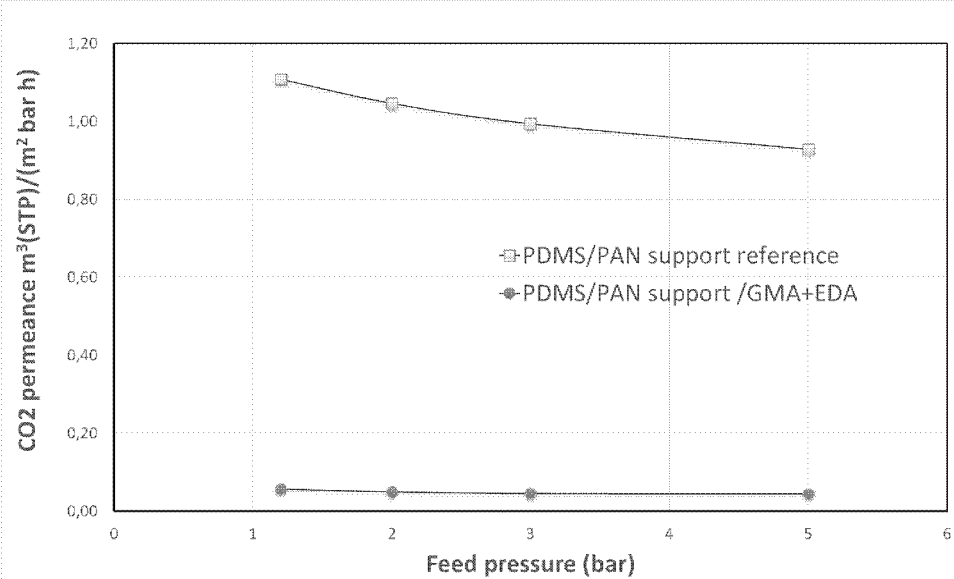
FIG. 4 shows the $CO_2$ permeance as a function of feed pressure (bar) at 25° C., gas feed 10% $CO_2$ in $N_2$ fully humidified for surface modified PDMS/PAN membranes with GMA+EDA.
Figure 5:
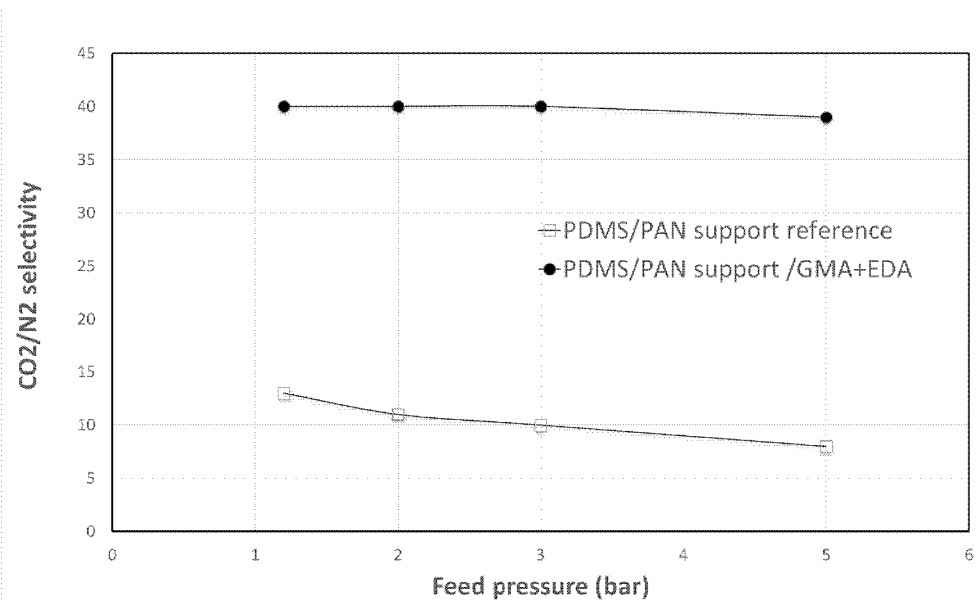
FIG. 5 shows the $CO_2/N_2$ selectivity as a function of feed pressure (bar) at 25° C., gas feed 10% $CO_2$ in $N_2$ fully humidified for the surface modified PDMS/PAN membranes with GMA+EDA.

The results were obtained by using commercial PDMS on PAN support which were modified with glycidyl methacrylate (GMA) first followed by reaction with 20% ethylene diamine (EDA) in aqueous solution according to method steps 1-3 described above. The results, CO$_2$ permeance and CO$_2$/N$_2$ selectivity as function of feed pressure, are shown in FIG. 4 and FIG. 5, respectively.

The surface modification reduced the CO$_2$ permeance, but increased the CO$_2$/N$_2$ selectivity 3-5 times compared with the reference membrane due to amine groups grafted on surface.

Example 3. PTMSP Based Membranes Surface Modified with Amine Groups

Self-standing membranes of poly(l-trimethylsilyl-1-propyne) PTMSP, were prepared by solvent casting from cyclohexane. The membranes were modified according to method steps 1-3 described above. The results are present in Table 2.

TABLE 2

CO$_2$ permeability/permeance and CO$_2$/N$_2$ selectivity of PTMSP membranes surface modified

| Membrane | CO$_2$ permeability (Barrer) | CO$_2$ permeance m$^3$(STP)/ (m$^2$ bar h) | CO$_2$/N$_2$ selectivity |
|---|---|---|---|
| PTMSP reference | 22840 | 2.5 | 6 |
| PTMSP + AEMA | 13650 | 0.75 | 11 |
| PTMSP + GMA Reference | 18154 | 0.49 | 7 |
| PTMSP + GMA + EDA | 14726 | 0.4 | 13 |
| PTMSP + DAEA | 2940 | 0.16 | 16 |

Obs. CO$_2$ permeability is equal to CO$_2$ permeance multiplied with membrane thickness for a given membrane. 1000 Barrer represents a permeance of 2.7 m$^3$ (STP)/(bar m$^2$h) for 1 micrometer thick membrane.

All surface modification methods reduced the CO$_2$ permeance more or less compared to the reference membrane, however, the CO$_2$/N$_2$ selectivity due to amine groups grafted on surface was doubled.

Example 4. Perfluoro Membranes (AF2400) Based Membranes Surface Modified with Amine Groups Exceptional results were obtained when using the surface modification approach with a surface modified perfluoro membrane (AF2400) by UV irradiation using method steps 1-3 described above, and amines AEMA and GMA+EDA. For a 50 µm membrane, a CO$_2$ permeability of 1900 Barrer (0.1 m$^3$ (STP)/(bar m$^2$ h) and a CO$_2$/N$_2$ selectivity over 500 at 55° C. were obtained, using humidified 10% CO$_2$ in N$_2$.

Figure 6:
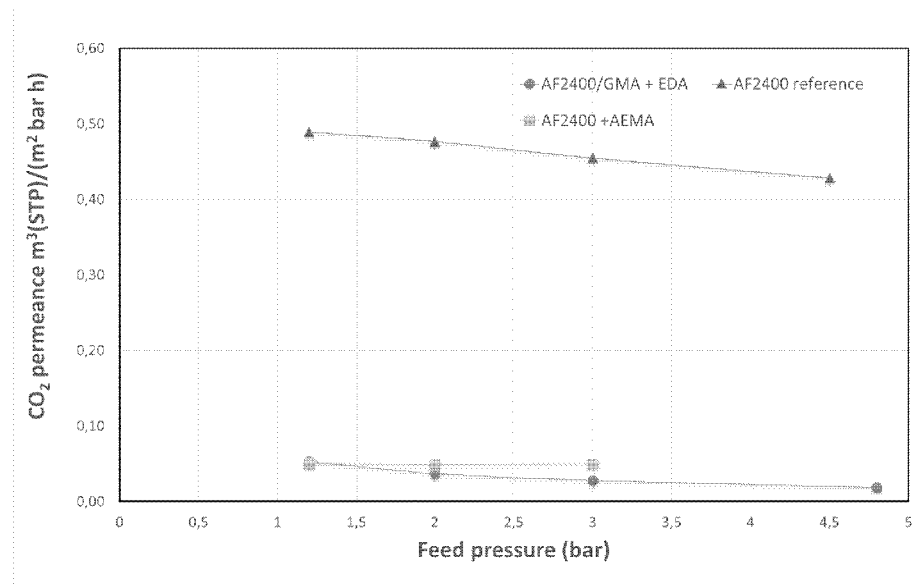
FIG. 6 shows the $CO_2$ permeance as a function of feed pressure (bar) at 25° C., gas feed 10% $CO_2$ in $N_2$ fully humidified for the AF2400 surface modified membranes with AEMA and GMA+EDA
Figure 7:
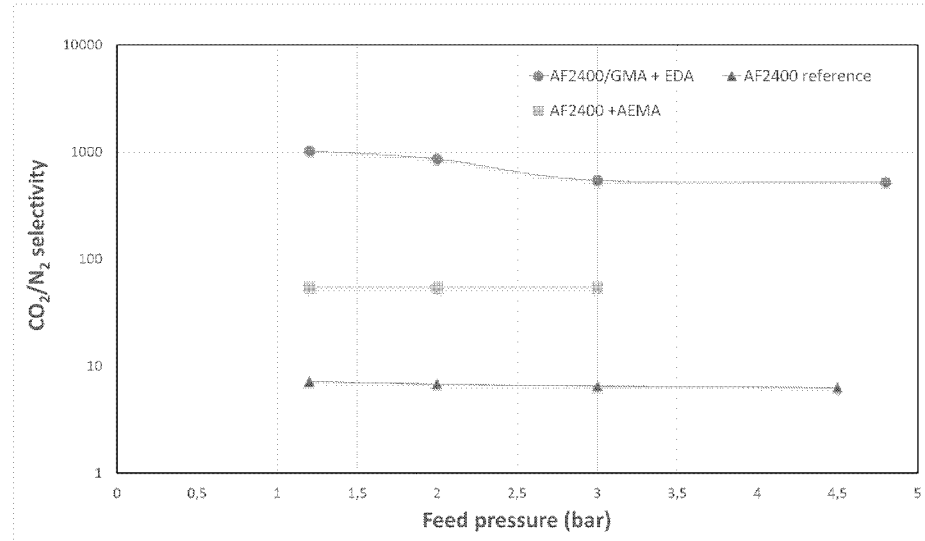
FIG. 7 shows the $CO_2/N_2$ selectivity as a function of feed pressure (bar) at 25° C., gas feed 10% $CO_2$ in $N_2$ fully humidified for the AF2400 surface modified membranes with AEMA and GMA+EDA.

FIG. 6 and FIG. 7 show the dependence on feed pressure of CO$_2$ permeance and CO$_2$/N$_2$ selectivity, respectively. It is clearly observed that the CO$_2$ permeance decreased, however, a tremendous CO$_2$/N$_2$ selectivity is achieved, especially for membranes modified with GMA+EDA.

Figure 8:
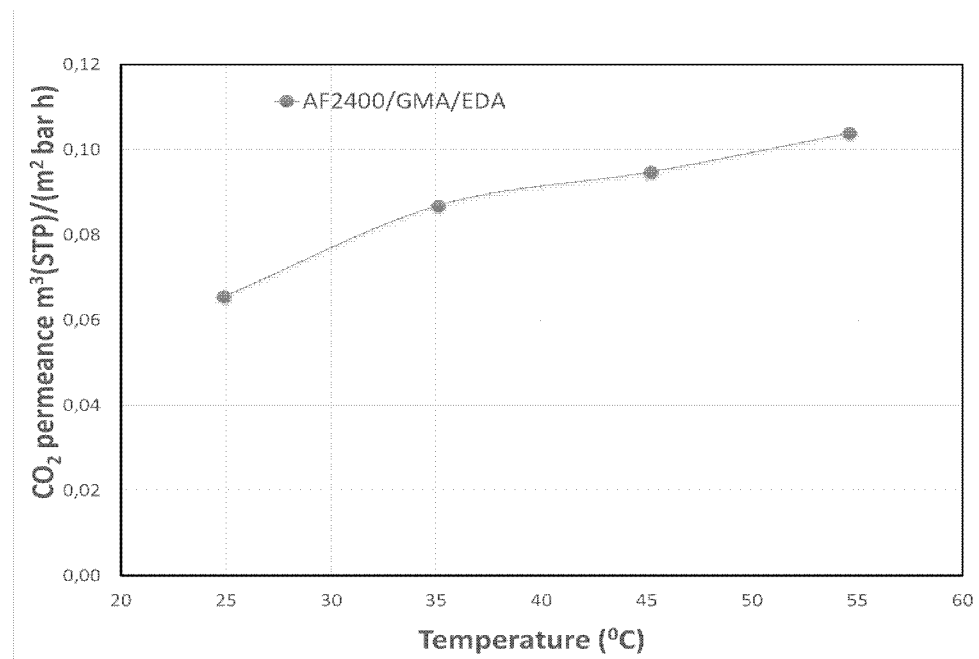
FIG. 8 shows the $CO_2$ permeance as a function of temperature at 1.2 bar feed pressure, gas feed 10% $CO_2$ in $N_2$ fully humidified for the AF2400 surface modified membranes with GMA+EDA.
Figure 9:
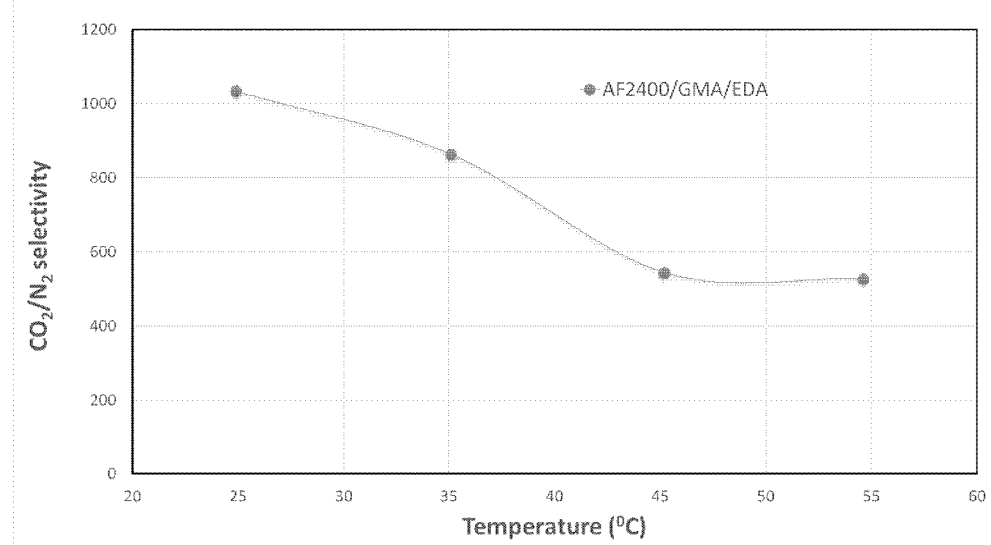
FIG. 9 shows the $CO_2/N_2$ selectivity as a function of temperature at 1.2 bar feed pressure, gas feed 10% $CO_2$ in $N_2$ fully humidified for the AF2400 surface modified membranes with GMA+EDA.

FIG. 8 and FIG. 9 show the temperature dependence of CO$_2$ permeance and CO$_2$/N$_2$ selectivity, respectively, for AF2400 membranes modified with GMA+EDA. The CO$_2$ permeance increases and CO$_2$/N$_2$ selectivity slightly decreases from 25 to 55° C. (flue gas temperature). This is probably due to increase of diffusion coefficients with temperature for both CO$_2$ and N$_2$ gases.

Results were well above the best polymeric membranes previously reported in the literature for CO$_2$/N$_2$ separation (Sanders, D. F., et al., *Energy-efficient polymeric gas separation membranes for a sustainable future: A review*. Polymer, 2013. 54(18): p. 4729-4761). The result at 1.2 bar feed pressure is plotted as  for an AF2400 membrane modified with GMA+EDA in FIG. 10 and compared with literature data.

Example 5. Perfluoro Membranes (AF2400) Based Membranes Surface Modified with Amine Groups for CO$_2$/CH$_4$ Separation (Natural Gas)

The test was performed with mixed gases, 10% CO$_2$ in CH$_4$, fully humidified at 25° C. (similar conditions to natural gas) at 2 and 5 bar feed pressure. The results obtained with a 50 µm thick membrane, are shown in table 3 below.

TABLE 3

CO$_2$ permeability/permeance and CO$_2$/CH$_4$ selectivity of AF2400 membranes surface modified with GMA + EDA

| Membrane/pressure | CO$_2$ permeability (Barrer) | CO$_2$ permeance m$^3$(STP)/ (m$^2$ bar h) | CO$_2$/CH$_4$ selectivity |
|---|---|---|---|
| AF2400 Reference/2 bar | 2135 | 0.48 | 5 |
| AF2400 + GMA + EDA/2 bar | 1332 | 0.073 | 548 |
| AF2400 + GMA + EDA/5 bar | 804 | 0.044 | 249 |

Obs. CO$_2$ permeability is equal to CO$_2$ permeance multiplied with membrane thickness for a given membrane. 1000 Barrer represents a permeance of 2.7 m$^3$ (STP)/(bar m$^2$h) for 1 micrometer thick membrane.

The results obtained for the surface modified membranes were well above the best polymeric membranes previously reported in the literature for CO$_2$/CH$_4$ separation (Sanders, D. F., et al., *Energy-efficient polymeric gas separation membranes for a sustainable future: A review*. Polymer, 2013. 54(18): p. 4729-4761). The result for the membrane AF2400+GMA+EDA at 5 bar is plotted as a star and compared with literature data in FIG. 11.

The invention claimed is:

1. A CO$_2$ selective dense gas separation membrane comprising
    a gas permeable support layer; and
    at least one dense gas permeable polymer layer deposited on the gas permeable support layer, the dense gas permeable polymer layer is surface modified with polymer chains having CO$_2$ philic groups, wherein the CO$_2$ philic groups are functional groups of C1-C10 linear or branched molecules, wherein the modified surface of the dense gas permeable polymer layer is in the form of polymer chains stretching out from defined grafting points providing an open, not cross-linked structure with a spatially controlled distribution of the CO$_2$ philic groups on the surface of the dense gas permeable polymer layer, wherein the CO$_2$ selective dense gas separation membrane does not require impregnation with a liquid.

2. The gas separation membrane according to claim 1, wherein the polymer chains having CO$_2$ philic groups are grafted onto the surface of the dense gas permeable polymer layer.

3. The gas separation membrane according to claim 1, wherein the dense gas permeable polymer layer is a water vapour permeable polymer.

4. The gas separation membrane according to claim 1, wherein the CO$_2$ philic groups are selected from amines, ethylene oxide, ethers, amides or hydroxyl groups.

5. The gas separation membrane according to claim 4, wherein the CO$_2$ philic groups are amines selected from ethylene diamine (EDA), diethylenetriamine or triethylenetetramine.

6. The gas separation membrane according to claim 1, wherein the gas permeable polymer layer comprises a perfluoro polymer or PDMS (polydimethyl siloxane) or PTMSP (poly[1-(trimethylsilyl)-1-propyne]) or PMP (poly (4-methyl-2-pentyne) or polyvinyl alcohol.

7. A method for preparing a CO$_2$ selective gas separation membrane, comprising the steps of:
    depositing at least one gas permeable polymer layer on a gas permeable support layer to form a dense membrane, surface modifying the dense membrane with grafted polymer chains having $CO_2$ philic groups to obtain spatially controlled distribution of the $CO_2$ philic groups on the surface thereof, wherein the surface modifying includes the sequential steps:

creating grafting points onto the membrane surface by treating the surface with an initiator;

removing unreacted initiator;

adding a monomer solution to the membrane surface, after the step of removing, wherein the monomer solution comprises $CO_2$ philic groups; and creating polymer chains starting from and stretching out from the grafting points forming an open, non-crosslinked structure by exposing the membrane covered by the monomer solution to UV radiation or radical polymerization.

8. The method according to claim 7, comprising successive steps of depositing dense gas permeable polymer layers and surface modifying the surfaces thereof with $CO_2$ philic groups to obtain a multi-layered structure having $CO_2$ philic groups attached to the dense gas permeable polymer layer on top, in the middle and in bottom of the dense gas permeable polymer layers.

9. A method of separating $CO_2$ from a gas mixture comprising:

contacting the gas mixture with a $CO_2$ selective dense gas separation membrane, the gas separation membrane including:

a gas permeable support layer; and at least one dense gas permeable polymer layer deposited on the gas permeable or porous support layer, the dense gas permeable polymer layer is surface modified with polymer chains having $CO_2$ philic groups, wherein the modified surface of the dense gas permeable polymer layer is in the form of a an open structure and wherein the polymer chains are stretching out from the grafting points, wherein the dense gas permeable polymer layer has a spatially controlled distribution of the $CO_2$ philic groups on the surface thereof and wherein the $CO_2$ selective dense gas separation membrane does not require impregnation with a liquid.

10. The gas separation membrane according to claim 6, wherein the perfluoro polymer comprises poly[4,5-difluoro-2,2-bis(trifluoromethyl)-1,3-dioxole-co-tetrafluoroethylene].

11. A method for preparing a $CO_2$ selective gas separation membrane, comprising the steps of:

depositing at least one gas permeable polymer layer on a gas permeable support layer to form a dense membrane, surface modifying the dense membrane with grafted polymer chains having $CO_2$ philic groups to obtain spatially controlled distribution of the $CO_2$ philic groups on the surface thereof, wherein the surface modifying includes the sequential steps:

creating grafting points onto the membrane surface by treating the surface with an initiator;

removing unreacted initiator;

adding a monomer solution to the membrane surface after the step of removing;

creating polymer chains starting from and stretching out from the grafting points by exposing the membrane covered by the monomer solution to UV radiation or radical polymerization forming an open, non-crosslinked structure; and functionalizing the polymer chains by reacting the grafted polymer chains with molecules containing $CO_2$ philic groups.

12. The method according to claim 7, comprising successive steps of depositing dense gas permeable polymer layers and surface modifying the surfaces thereof with $CO_2$ philic groups to obtain a multi-layered structure having $CO_2$ philic groups attached to the dense gas permeable polymer layer on top, in the middle and in bottom of the dense gas permeable polymer layers.

13. The method according to claim 11, comprising successive steps of depositing dense gas permeable polymer layers and surface modifying the surfaces thereof with $CO_2$ philic groups to obtain a multi-layered structure having $CO_2$ philic groups attached to the dense gas permeable polymer layer on top, in the middle and in bottom of the gas permeable polymer layers.

* * * * *